O. T. HOYT.
DRAFT EQUALIZER.
APPLICATION FILED AUG. 9, 1913.
1,153,388.
Patented Sept. 14, 1915.
2 SHEETS—SHEET 2.
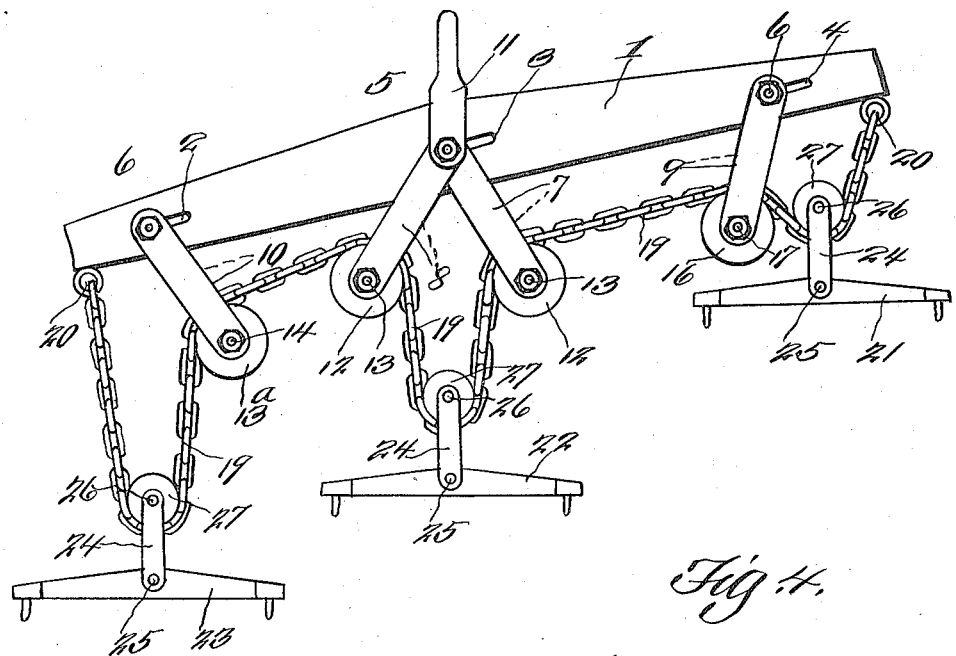
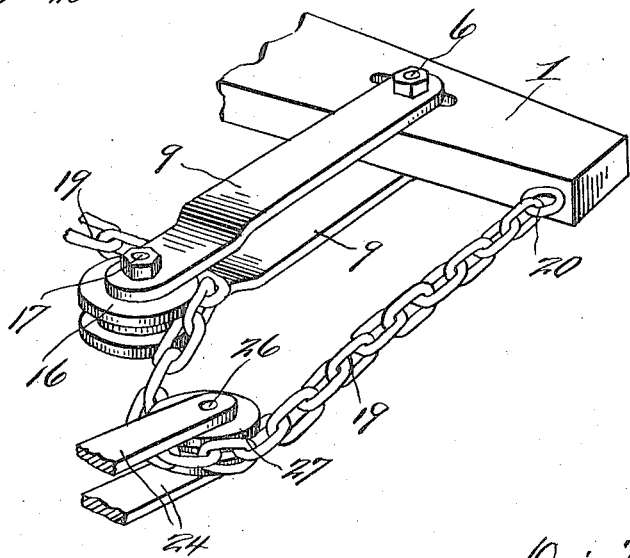

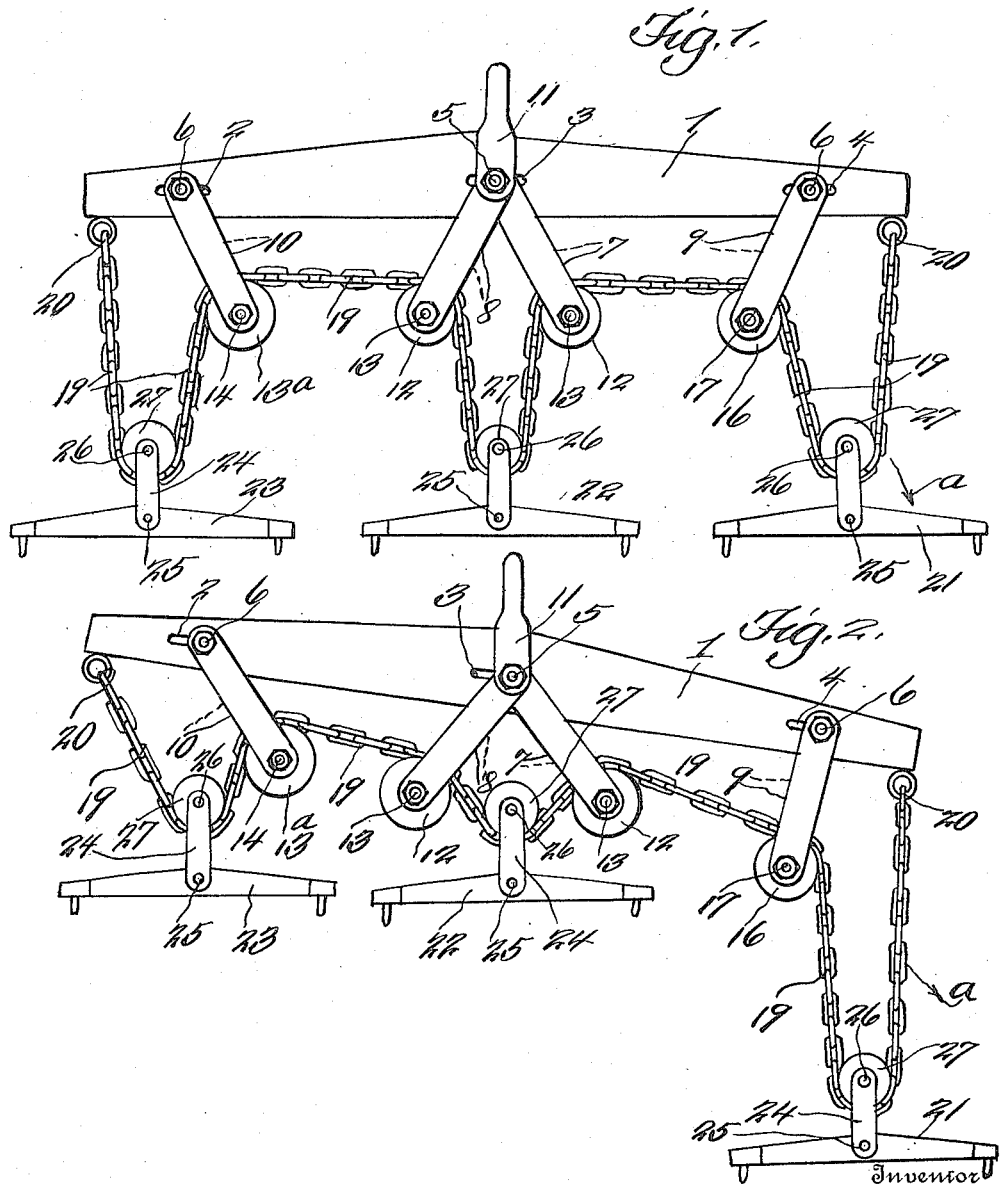

UNITED STATES PATENT OFFICE.

ORIS T. HOYT, OF GOOD HOPE, ILLINOIS.

DRAFT-EQUALIZER.

1,153,388.     Specification of Letters Patent.     Patented Sept. 14, 1915.

Application filed August 9, 1913. Serial No. 783,896.

*To all whom it may concern:*

Be it known that I, ORIS T. HOYT, a citizen of the United States, residing at Good Hope in the county of McDonough and State of Illinois, have invented a new and useful Draft-Equalizer; and I do hereby declare the following to be a full, clear, and exact description of the invention, such as will enable others skilled in the art to which it appertains to make and use the same.

This invention relates to a new and useful draft equalizer.

An object of the invention is to provide an improved equalizer, which is simple, durable and inexpensive in construction, and one which will quickly equalize the draft at all points.

One of the features of the invention is the provision of a main equalizer beam having a series of openings, in which links are connected having rollers over which a draft chain passes, which chain also passes over rollers of links connected to swingletrees, thereby affording a draft equalizer, so that when a greater part of the load or draft is thrown upon either one of the outer animals it will be quickly returned upon the other two animals.

In practical fields the details of construction may necessitate alterations, to which the patentee is entitled, provided the alterations fall within the scope of what is claimed.

The invention comprises further features and combination of parts, as hereinafter set forth, shown in the drawings and claimed.

In the drawings:—Figure 1 is a plan view of the eqealizer, showing the swingletrees attached. Fig. 2 is a plan view showing the greater part of the draft or load on one of the outer animals. Fig. 3 is a plan view showing the position of the other two swingletrees, after the load or draft has been quickly returned back to the other two animals. Fig. 4 is a detail perspective view of one end of the evener beam, showing the links 9 and a portion of the chain 19 passing thereover.

Referring more particularly to the drawings, 1 designates the main equalizer beam having three openings 2, 3 and 4, through which the bolts 5 and 6 extend, which bolts also pass through the links 7 and 8, and 9 and 10. The bolt 5 also passes through a clevis 11, which is designed to be connected to a wagon or the like. Arranged between the links 7 and 8 are groove rollers 12 mounted upon the bolts 13, while arranged between the links 10 is a roller 13ª, also mounted upon the bolts 14, whereas between the links 9ª roller 16 is arranged on a bolt 17. Passing over the rollers of the links 7 and 8, and 9 and 10 is a chain 19, detachably connected at 20 at each end of the equalizing beam. Swingletrees 21, 22 and 23 are provided, to which the links 24 are connected by the bolts 25. The bolts 26 also pass through the links 24, which bolts 26 act as journal pins for the rollers 27, over which the chain also passes.

Referring to Fig. 1 it will be seen that the draft is equally distributed, while in Fig. 2 the greater part of the draft or load has been shifted to one of the outer swingletrees, in which case the outer swingletree moves laterally in the direction of the arrow *a* and forwardly, at the same time the equalizing beam assumes an angle. Just so soon as these actions occur, the equalizing beam instantly assuming such angles as shown in Fig. 2, the greater part of the load or draft is returned or transferred back to the other two swingletrees, thereby causing the parts of the equalizer to assume the position as shown in Fig. 3. These actions are more or less quickly performed, owing to the provision of the links of the equalizing beam and the openings 2, 3 and 4, thereby in this manner an efficient, durable and practical draft equalizer is afforded.

The invention having been set forth, what is claimed as new and useful is:—

A draft equalizer comprising a beam constituting an evener and having a slot adjacent each end and a substantially centrally disposed slot, a clevis connection connected to said centrally disposed slot and designed for connection to a vehicle, a multiplicity of links arranged in pairs, two pair being pivotally joined and having pivotal connections at their joined ends with said clevis in the centrally disposed slot, while another pair has a bolt connection with each end slot, said links having rollers between their free ends, a draft chain having its ends connected to opposite ends of the evener beam, the chain intermediate such end connections passing over the rollers of said links and forming loops, one loop being beyond the roller of each pair of end links, and a third loop extending from between the rollers of the two pairs of centrally connected links, a plurality of swingletrees having link and roller connections with the loops of the draft chain, said bolt and slot connections constituting means to permit the beam to shift incident to shifting the draft from one portion of the draft chain to another.

In testimony whereof I have signed my name to this specification in the presence of two subscribing witnesses.

ORIS T. HOYT.

Witnesses:
W. P. Fox,
G. H. Stepp.